United States Patent [19]

Davis

[11] 4,074,408
[45] Feb. 21, 1978

[54] METHOD FOR MAKING VEHICLE WHEEL ASSEMBLY

[75] Inventor: Dalton M. Davis, Clayton, Calif.

[73] Assignee: FDI, Inc., Cleveland, Ohio

[21] Appl. No.: 698,420

[22] Filed: June 21, 1976

[51] Int. Cl.² .......................... B21H 1/02; B21K 1/32
[52] U.S. Cl. .............................. 29/159.01; 29/159.03; 29/283.5; 29/516; 29/802; 72/401; 301/65; 301/67
[58] Field of Search ............ 29/159.01, 159.03, 159.1, 29/159 R, 159.3, 505, 508, 516, 802, 281.1, 283.5; 301/65, 63 R, 67, 64.5 D, 64 R; 72/401

[56] References Cited

U.S. PATENT DOCUMENTS

| | | | |
|---|---|---|---|
| 1,741,716 | 12/1929 | Hunt | 29/159.01 X |
| 2,713,197 | 7/1955 | Schmidt | 29/159.01 X |
| 2,830,168 | 4/1958 | Taylor | 29/159.01 X |
| 3,145,457 | 8/1964 | Lemmerz | 29/159.01 |
| 3,635,529 | 1/1972 | Nass | 29/159.03 X |
| 3,725,992 | 4/1973 | Davis | 29/159.01 X |
| 3,800,600 | 4/1974 | Chapin | 29/159.01 X |

*Primary Examiner*—Victor A. DiPalma
*Attorney, Agent, or Firm*—Alter and Weiss

[57] ABSTRACT

A vehicle wheel assembly and method and apparatus for making the assembly in which an outer tire rim and wheel center are fabricated into a secure one-piece unit. Secure attachment and restraint of the two components into one unit are accomplished through a dimpling process in which both components are nested together at a plurality of points through stamping. While very applicable to a steel rim or steel center wheel construction, the invention is adapted for use on several metallic wheel constructions to avoid pneumatic leakage associated with riveting or problems arising from welding of the two components. A fixture and hydraulically operated tool construction utilizes male and female tooling to accomplish the dimpling process in which regions of the wheel rim and center are deformed by force to nest together.

11 Claims, 5 Drawing Figures

METHOD FOR MAKING VEHICLE WHEEL ASSEMBLY

BACKGROUND OF THE INVENTION

The present invention relates, in general, to a vehicle wheel apparatus and in particular to multi piece vehicle wheels wherein a tire rim is attached to a central hub body.

For quite some time automotive manufacturers and particularly wheel manufacturers have produced two-piece wheel assemblies which have a center hub portion or spider for attachment to the vehicle, within a pneumatic tire rim device. In the past the tire rim and central body have been joined together by various means. The two most widely accepted methods for joining the two wheel components into a single integrated unit have been resistance welding and riveting. Both these methods have been widely used in wheel constructions wherein the outer tire rim component is fabricated of steel, whether the central body is fabricated of steel or various non-ferrous metals.

While the rivet method has good strength properties, there are several drawbacks associated with it. Among these drawbacks is the fact that penetration of both the tire rim and central body portion of the wheel can allow air to leak around the rim attachment, thus affecting the usability of the wheel with a tubeless tire application. Quite often, to guarantee that no air leakage occur when using the rivet method, a self-sealant rivet or protective coating over the standard rivet is applied. While the success of these preventive procedures is quite good, it nonetheless drastically increases production costs and is not well accepted.

Resistance welding is the most common method for connecting the outer rim portion and central body portion of the wheel into an integrated, sturdy unit. However, reliability of spot fusion between the rim and the central body portion is often difficult to maintain and inspect. Inherent with the use of the resistance welding method is the need for higher quality control through X-ray or destructive testing. Possible deterioration of the weld could, in some cases, further lead to the undesirability of this particular process, especially in view of the fact that equipment costs and power consumption are extremely high for this mode of fabrication.

Other means for rigidly fusing the pneumatic tire rim component to the wheel center body have included the utilization of steel inserts which are cast into the wheel center body and are welded to the steel rim, such as is disclosed in U.S. Pat. Nos. 3,250,571 and 3,250,572. Additionally, a wheel having a non-ferous metal center body and pneumatic tire rim of malleable metal, has been attached through the use of dimple-like depressions formed in the peripheral ring of the center body by stamping protruberances from the tire rim into the central body to cause a tight fit therewith, as disclosed in U.S. Pat. No. 3,635,529. It is important to note that in this prior art the manner of securing the outer tire rim to the inner wheel center is adaptable primarily to wheels having an outer steel tire rim and an inner non-ferrous metal center, since such a non-ferrous center body portion would have a substantial metal depth around its periphery to accommodate the dimple, towards restraining the rim in its place.

While various attempts have been made in the past to secure a steel rim to a steel spider or center body without the use of rivets or welding, no such prior methods have provided structures capable of production with reliability for strength and function to all the forces acting on the wheel assembly in its total operation and life cycle.

It is thus an object of the present invention to enable strong, secure and restrained attachment of a pneumatic tire rim to a center body to form an integrated wheel assembly.

It is further an object of the present invention to accomplish such an integration of the tire rim and center body without the need for riveting or resistance and spot welding so as to avoid the air leakages, deterioration and other problems inherent with these previous attachment practices.

It is also an object of the present invention to provide a facilitated and lower cost method of joining the rim to the interior center body, which is especially adaptable to securing a steel rim to a steel center body, while at the same time providing an alternative to convention rim-to-center attachment operation which requires no special alignment of the center body when the center body has an outer peripheral band which is continuous in nature.

These and other objects of the invention will become apparent as set forth herein.

SUMMARY OF THE INVENTION

The present invention is a vehicle wheel assembly having a metallic center body with a substantially circular shape. The center body has a hub portion and a substantially flat outer peripheral band with a metallic pneumatic tire rim radially juxtaposed around this peripheral band and in a concentric relationship with the center body means. The pneumatic tire rim is restrained in tight intimate position about a center body means through a plurality of telescoping protruberances each of which comprises a radially inwardly extending indentation of both the peripheral band of the center body means and the juxtaposed tire rim means. Further, the plurality of protruberances into the outer peripheral band of the center body means and the pneumatic tire rim means, maintain the tire rim means and the center body means together in a rigid, integrated assembly.

In the preferred embodiment of the invention, each of the protruberances comprises a geometrically shaped two-layer dimple, the upper layer being formed by the pneumatic tire rim means and the lower layer being formed by the outer peripheral band of the center body means. Additionally, the geometrically shaped dimple is a substantially conical depression, having a substantially circular circumference. This characteristic of the invention assists in imparting application of such a construction when both the pneumatic tire rim means and the center body means are formed of steel.

The method for manufacturing such a wheel assembly encompasses fixedly attaching the metallic center body means, having the previously mentioned hub portion and substantially flat outer peripheral band, to the metallic tire rim means, juxtaposed around the peripheral band and concentric therewith, through the plurality of telescoping protruberances at which nesting of the tire rim and outer band of the center body means occurs. This method comprises the steps of:

a. positioning the center body means within the tire rim means so that the tire rim means is closely juxtaposed to the flat outer peripheral band of the center body means;

b. firmly locating the plurality of female forming tools along the interior circumferential perimeter of the flat outer peripheral band;

c. forcing a plurality of aligned male forming tools positioned on the outside of the tire rim means into the tire rim means and, in turn, the center body means towards and into the female forming tool so as to dimple a portion of the tire rim means into the flat outer peripheral band of the center body together, thereby forming the protruberance; and d. withdrawing the plurality of male forming tools from the region of the formed protruberance.

In the preferred embodiment of the present method for manufacturing and integrating a multi-piece wheel assembly, the center body means is positioned in a closely juxtaposed manner to the tire rim means, through the use of a tight interference fit between the tire rim means and the center body means. The interference fit is obtained since the innermost circumferential dimension of the tire rim is smaller than the circumferential dimension of the outer peripheral band of the center body means. This is further accomplished by positioning the center body means and the tire rim means is a concentric position relative to one another, followed by pressing, preferably through hydraulic fixture means, the center body means and tire rim means together by force.

In the preferred embodiment of the invention, additionally, the hydraulic fixture means utilized to place the center body means and the pneumatic tire rim means into close juxtaposition, comprises a center body restraining fixture on which the center body means is securely positioned, and in which the hub portion may be restrained; lower tire rims support means on which the lower portion of the pneumatic tire rim rests; and upper rim platen press means which are positioned on top of the upper portion of the pneumatic tire rim and which is capable of pressing the tire rim means about the center body means.

The hydraulic fixture means further comprises peripheral band locating means comprising pins which protrude through the plurality of wheel mounting orifices in the hub portion of the center body means. These locating means locate the outer peripheral band between the plurality of male and female forming tools, thereby ensuring proper placement of the protruberances in the outer peripheral band, especially when the band is non-continuous in design, such as on a spider center wheel. On such a wheel, rather than having a continuous unbroken outer peripheral band, the center body means may comprise a five or six arm spider assembly having segments of peripheral band at the outer location of each particular arm. With such a wheel, however, there are areas of space between the respective arms of the spider. It is thus necessary to locate the wheel appropriately so that it is indeed the portions of outer peripheral band on the arms which are aligned with the male and female forming tools, so that the protruberances may be appropriately placed. In such a circumstance, the wheel should be located by the locating means discussed above, so as to avoid the possibility of interposing any of the space areas between the male and female forming tools which would otherwise result in a non-functional protruberance formed of only one layer of material, namely that of the pneumatic tire rim means.

The female forming tools, in the preferred embodiment, of the invention, after being firmly located along the interior circumferential perimeter of the flat outer peripheral band, are further reinforced so as to maintain the female forming tool in an aligned, restrained relationship with respect to the male tool means and the wheel assembly as a whole during the protruberance-forming process. This is accomplished by an articulated tool support fixture located proximate to the center body means which further locates the female tool towards proper alignment with the male tool, prevents undesired movement of the female tool during actuation of the male tool means, at which time the protruberance is formed and serves to take or accept the majority of force exerted by the male tools.

While both the male and female tools may be actuated and positioned by any one of various mechanical means, the preferred embodiment of the invention calls for hydraulic actuation of both. These aligned male and female forming tool means additionally comprise three or more batteries of tools which are radially positioned about the wheel assembly, with each of said batteries having two or more of the male and female forming tool pairs positioned. Further, all of the plurality of male and female tool forming means are actuated simultaneously during the protruberance-forming process to enable the counterbalancing of forces which are exerted on the wheel assembly.

In order to impart a conical geometric shape to the protruberances, it is preferred that the plurality of male forming tools themselves each have a conical geometric shape. The best results encountered in the protruberance-forming operation requires that each of these conically shaped male forming tools have a conical angle in a range of from 45° to 60°. Further, in order to impart a protruberance to the tire rim means and center body means to the desired extent, without overly deforming the metal to avoid failure of the protruberances, the plurality of male forming tools should have a diameter in the range of $\frac{2}{3} \pm 5\%$ of the opening dimension possessed by each of the plurality of female forming tools. This tool construction ratio not only enables satisfactory construction of a secure protruberance, but also enables the facilitated removal of the female forming tool from around a fabricated protruberance after the dimpling process has taken place.

Through such a procedure an appropriate series of protruberances are imparted to the multi-piece wheel assembly to securely restrain the positions of the pneumatic tire rim to the center body means towards a successfully secure and integrated wheel assembly unit.

DETAILED DESCRIPTION OF THE DRAWINGS

Figure 1:
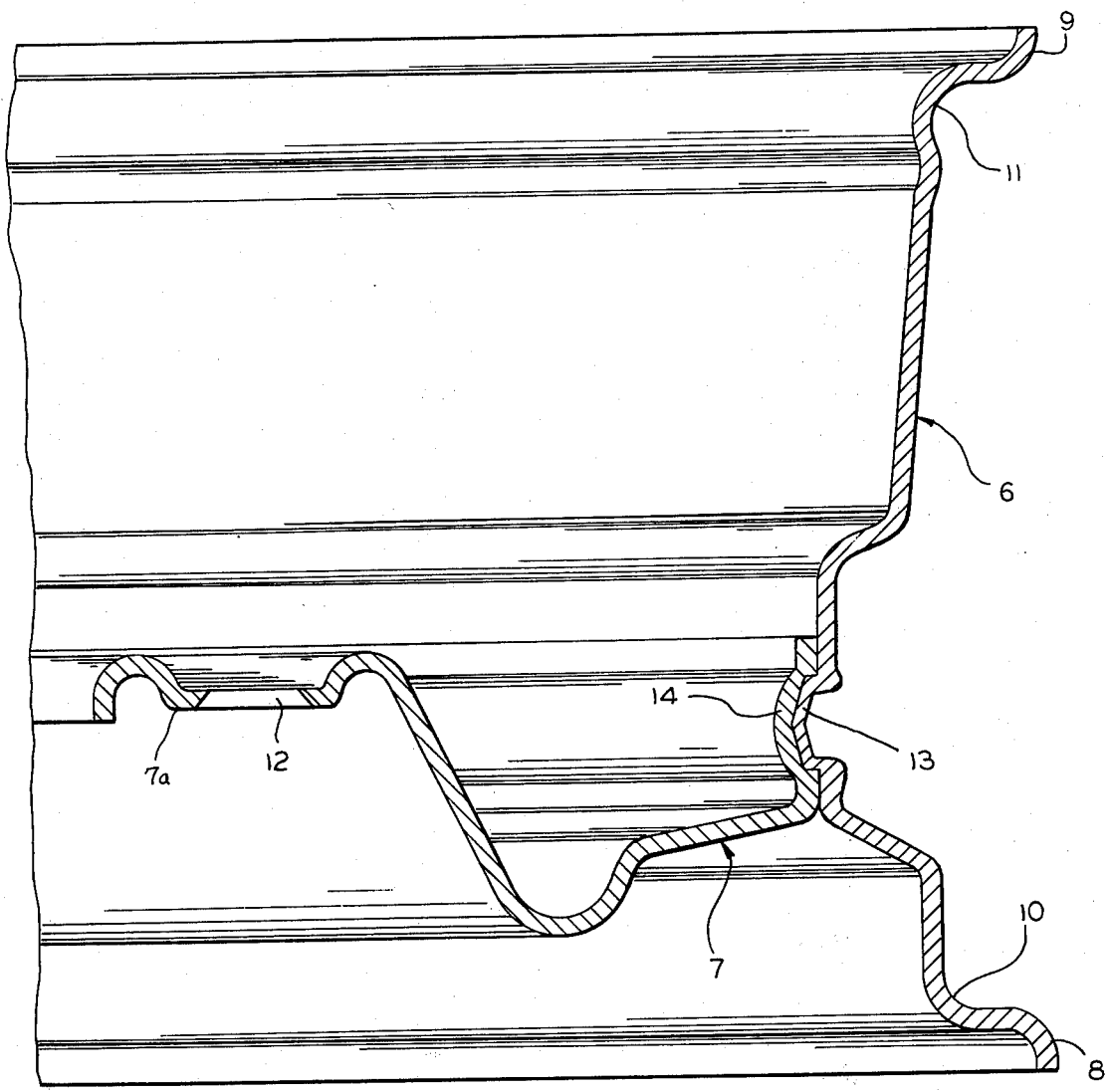
FIG. 1 of the drawings is an elevational, cross-sectional view of a portion of the vehicle wheel assembly of the present invention.

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiment illustrated.

A portion of the vehicle wheel assembly itself is shown in FIG. 1 a comprising pneumatic tire rim means 6 and center body means 7 having hub portion 7(a). In the typical application, pneumatic tire rim means 6 has flanges 8 and 9 at its upper and lower ends within which a standard vehicle tire is positioned at regions 10 and 11 respectively. Hub portion 7(a) of center body means 7 has a plurality of wheel mounting orifices, such as wheel mounting orifice 12, for the purpose of attaching the wheel along with a tire to the vehicle. Additionally, center body means 7 has outer peripheral band 14 which, in FIG. 1 at this particular location, is nested at a protruberance with region 13 on tire rim 6.

Figure 2:
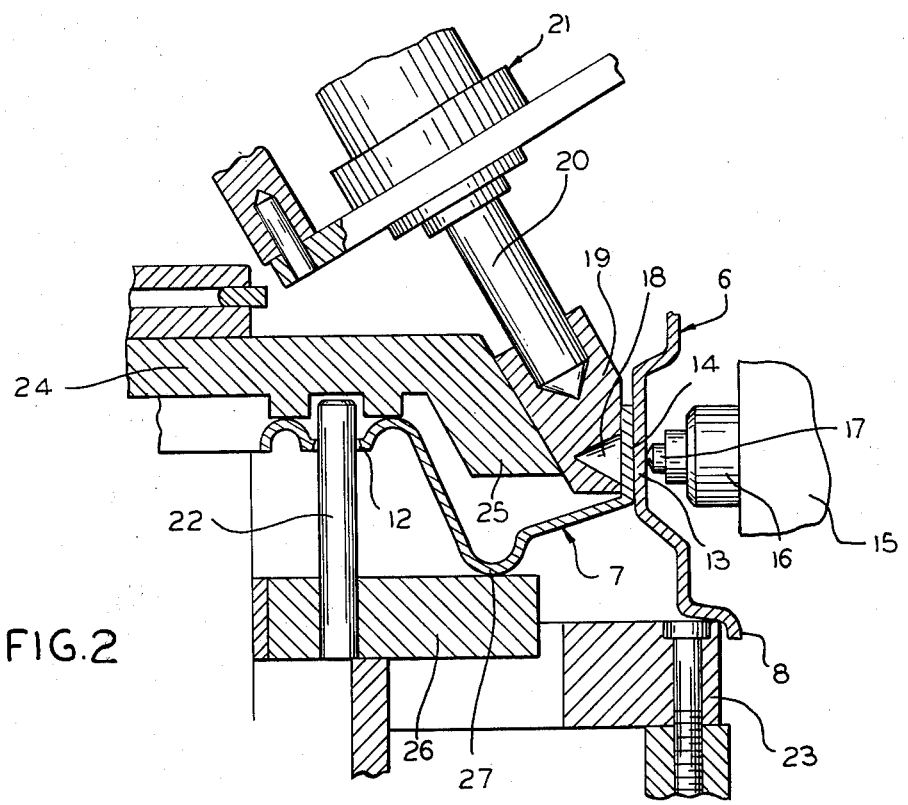
FIG. 2 is an elevated cross-sectional view showing, particularly, the alignment of male and female tooling for fabrication of the telescoping protruberances.
Figure 3:
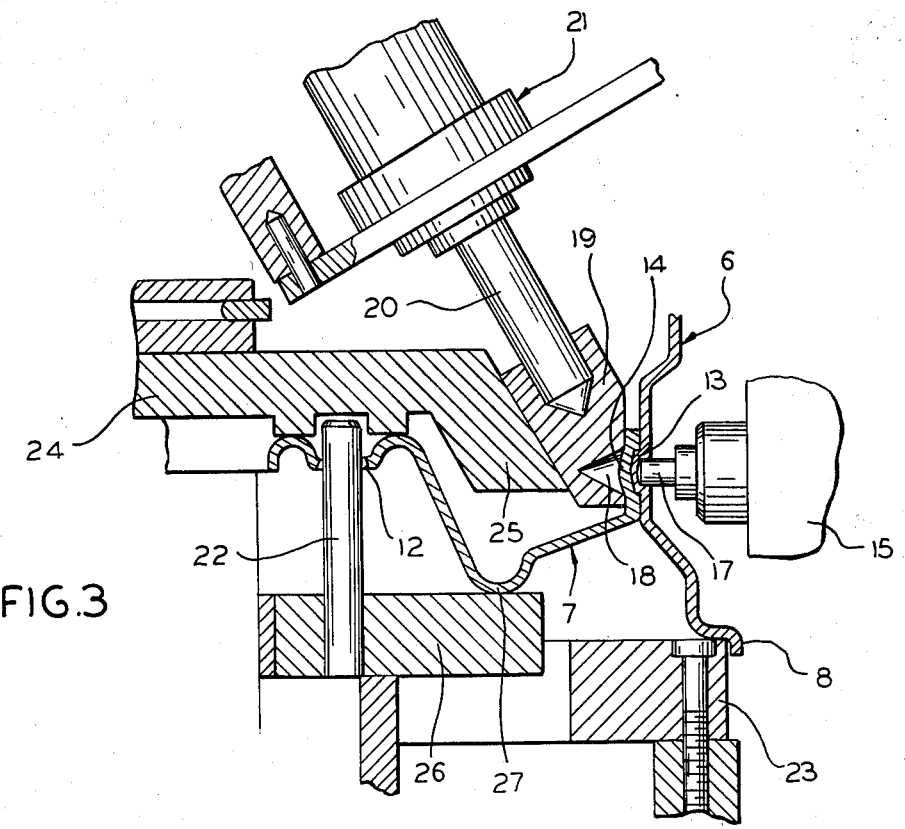
FIG. 3 is an elevated cross-sectional view illustrating, particularly, the operation of the male and female tooling upon actuation to form protruberances in the present invention.

FIGS. 2 and 3 sequentially show the method through which fabrication of a plurality of protruberances through tire rim 6 and center body 7 is obtained. In FIG. 2, for example, center body 7 is restrained within tire rim means 6 by an interference fit in which outer peripheral band 14 is juxtaposed immediately to the interior perimeter of tire rim means 6. Female tool 19, with substantially conical opening 18, is aligned with male tool 17 protruding off of shaft 16 of hydraulic mechanism 15. Additionally shown in FIG. 2 is articulated tool support fixture 24 with ledge 25 which further locates female tool 19 towards proper alignment with male tool 17 and prevents undesired movement of female tool 19 during actuation of male tool 17. Locating pin 22 through wheel mounting orifice 12, center body restraining fixture 26 on which center body means 7 is securely positioned at surface point 27, lower tire rim support means 23, and female hydraulic actuation mechanism 21 are also shown in FIG. 2.

FIG. 3 of the drawings particularly illustrates the wheel assembly fabrication process set forth by FIG. 2 but now illustrates hydraulic actuation means 15 forcing male tool 17 into outer tire rim means 6 at point 13 which, in turn, forces outer peripheral band 14 towards and into female tool opening 18 in female tool 19. In the peferred embodiment, the locating and positioning of female tool 19 is accomplished through hydraulic actuation of mechanism 21 through shaft 20. Female tool 19 has been further restrained in its position along the inside of outer peripheral band 14 by articulated tool support fixture 24 through its ledge portion 25.

Figure 4:
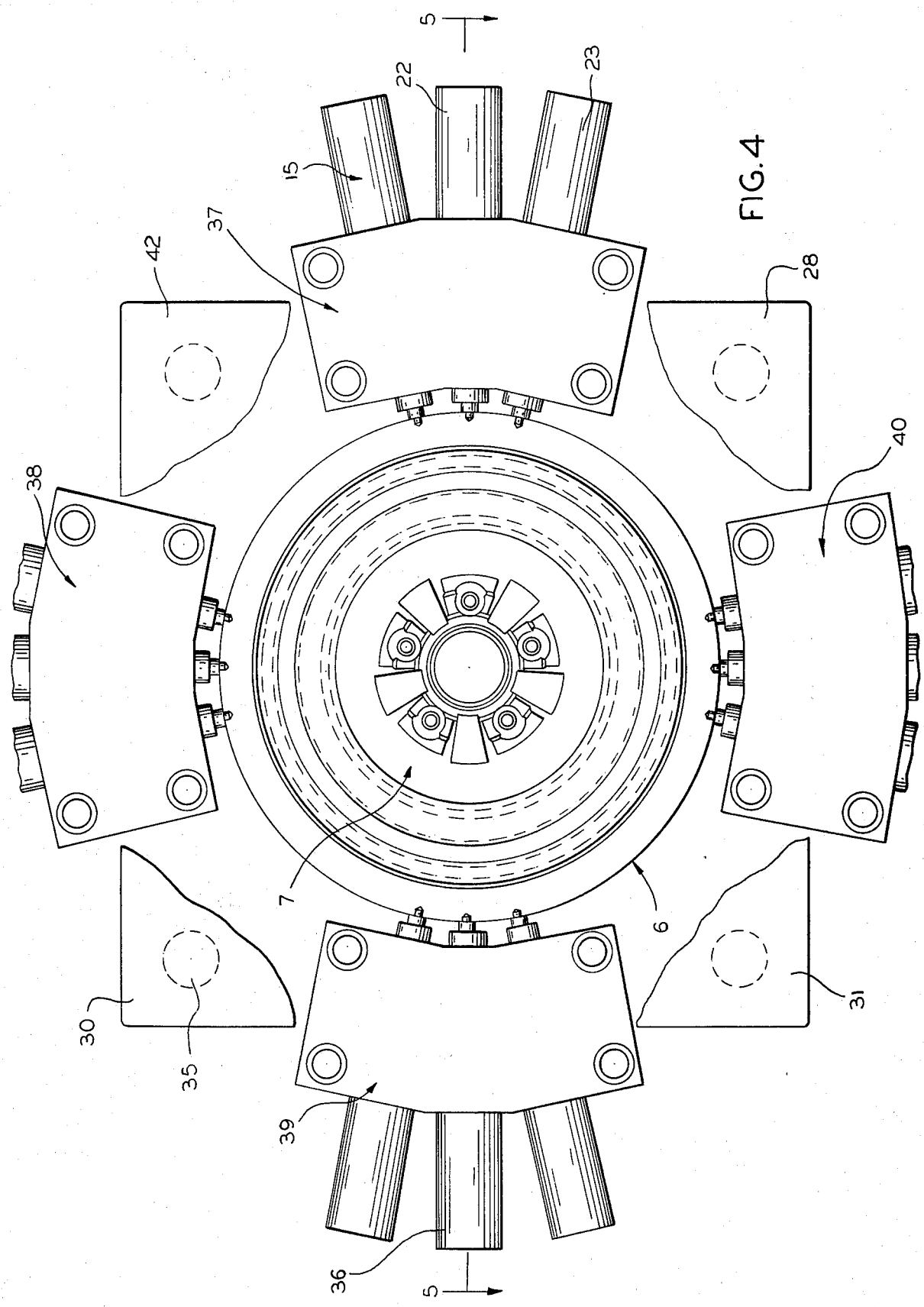
FIG. 4 is a top plan view of the vehicle wheel fabrication assembly, showing particularly, placement of a plurality of forming tool batteries about the wheel assembly.

FIG. 4 of the drawings shows in overhead the positioning of a plurality of male and female tool pairs around the periphery of the entire wheel. As is shown, tool batteries 37, 38, 39 and 40, each of which has three hydraulically operated male tools, such as male tools 15, 22 and 23 in battery 37, are aligned with corresponding female tooling positioned about the inner perimeter of the outer periphral band of center body means 7. Also shown in FIG. 4 are corners 28, 42, 30 and 31 of upper rim platen press 30, which utilizes shafts, such as shaft 35 to locate the positioning of platen press 30 through its operation. It is also important to note that tool batteries 37, 38, 39 and 40 are appropriately positioned about the periphery of tire rim 6, so that the forces exerted on tire rim 6 and body center 7 from any one battery of tools when actuated, are offset by equivalent forces working in an opposite direction by another battery. Thus, the forces exerted against tire rim 6 and body center 7 by the male tools positioned within tool battery 38 are equivalently offset by forces exerted by those male tools positioned within battery 40 and, similarly, for batteries 37 and 39 respectively. In this way, the process and the apparatus avoid the uneven loading of the wheel during fabrication of the protruberances and thereby avoid problems with wear, fatigue, and misalignment that could be presented by such uneven loading.

Figure 5:
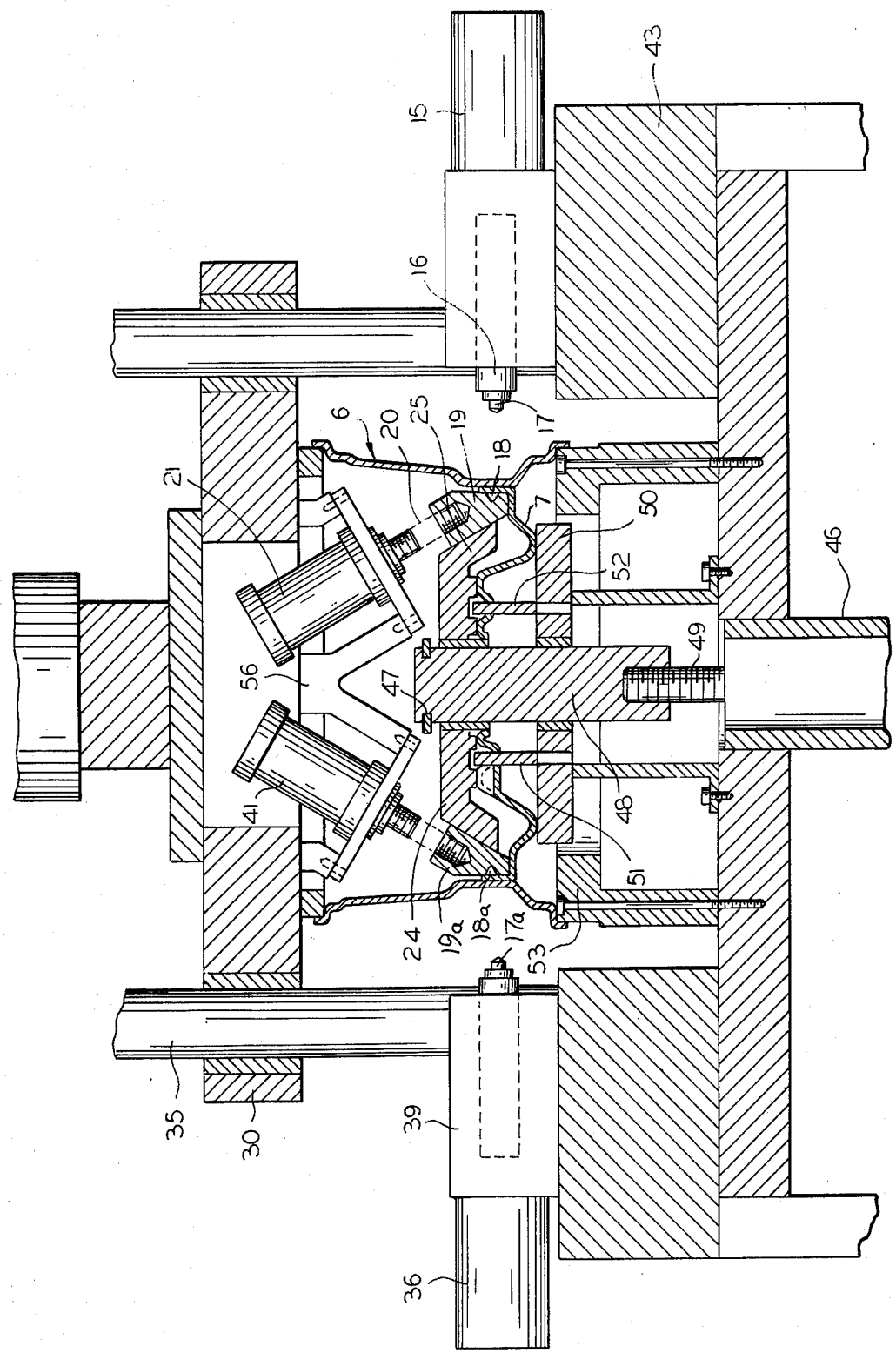
FIG. 5 is an elevated cross-sectional view taken along lines 5—5 and looking in the direction of the arrows setting forth in detail the present invention, including the apparatus and method for fabricating a vehicle wheel assembly in the preferred embodiment.

FIG. 5 of the drawings shows in greater detail the structure of the apparatus through which the protruberances are fabricaied, as well as the yet undimpled wheel assembly placed therein. Tool actuating mechanisms 36 and 15 in tool batteries 39 and 37 respectively, are positioned about the outside periphery of tire rim means 6. In operation, center body means 7 is located on center body restraining fixture 50 through the use of locating pins 51 and 52 which are inserted through the wheel mounting orifices within the hub portion of center body means 7. These pins, especially where the outer peripheral band is non-continuous, locate the center body and and outer peripheral band towards proper relationship to male and female tooling for assembly. Hub portion restraining means 48 comprises a hydraulic pusher within which a C-washer, 47 is located by groove. Piston 46 is loaded through shaft 49 until washer 47 locks against articulated tool support fixture 24 which, in turn, places pressure on the hub portion of center body means 7 and fixedly restrains it in position against center body restraining fixture 50. Pneumatic tire rim 6 can then be placed over center body means 7 and forced into an interference fit with center body means 7 by forcing tire rim means 6 downwardly, for instance, by upper rim platen press means 30. Tire rim 6 will be pressed downwardly until intersecting with lower tire rim support means 53, at which time tire rim 6 and the center body 7 are pressed together into the interference fit since the interior diameter of the tire rim 6 is slightly less in diameter than the outer diameter of the outer peripheral band on center body means 7. A reverse interference fit process can be used wherein tire rim 6 is held stationary while center body 7 is forced therethrough with the same resulting structure.

For fabrication of the plurality of protruberances, the female hydraulic mechanism 21 and 41 are actuated so that female tools 19 and 19(a) respectively are inserted and located against the interior perimeter of the outer peripheral band of central body means 7. These female tools, 19 and 19(a) are further restrained in this position by the abutting edge 25 of articulated tool support fixture 24. Male hydraulic mechanism 15 and 36 may then be actuated once female tool openings 18 and 18(a) are in proper alignment with male tools 17 and 17(a) respectively. The male tools 17 and 17(a) are forced into the appropriate regions on tire rim 6 by telescoping first into the tire rim means which, in turn, telescopes into the outer peripheral band of center body 7. As previously discussed, all male tools load the pneumatic tire rim simultaneously so that the forces applied to the wheel assembly are balanced. Further, the forces exerted on the plurality of female tools, such as female tool 19 and 19(a) are substantially taken by articulated tool support fixture 24 and support fixture flange 25. Additionally, female tools 19 and 19(a) are placed on a given angle with an appropriate female opening, 18 and 18(a) to enable retraction of the female tool from around the protuberance in the outer peripheral band of center body 7. Thus, in this preferred embodiment, after the dimpled protuberances are formed by the male and female tools, both are retracted and the upper rim platen press means are withdrawn to enable removal of the fully assembled, integrated vehicle wheel assembly.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

I claim:

1. A method for manufacturing a wheel assembly by fixedly attaching a metallic center body means having a hub portion and an outer peripheral band, to a metallic tire rim means juxtaposed around said peripheral band in a concentric manner through the use of a plurality of telescoping protruberances, each of which extends radially and at which indentation and nesting of said tire rim means and said outer band of said center body means occurs, said protruberances being fabricated by a plurality of aligned male and female forming tool means, which co-operate with tool support fixture means comprising the steps of:

forcing and maintaining said center body means within said tire rim means in an interference fit so that said tire rim means is closely juxtaposed to said outer peripheral band of said center body means through said tool support fixture means;

firmly located and positioning said plurality of female forming tool means along the interior circumferential perimeter of said outer peripheral band so as to abut a portion of said female forming tool means between said interior circumferential perimeter and said tool support fixture means to maintain said female forming tool means in an aligned restrained position with respect to said male tool means and said wheel assembly during actuation of said male tool means;

forcing said respective plurality of aligned male forming tool means, positioned on the outside of the tire rim means, into said tire rim means and in turn said center body means towards and into said female forming tool means so as to dimple a portion of said tire rim means into said outer peripheral band of said center body together, thereby forming said protruberance; and withdrawing said plurality of male forming tool means from the region of said formed protruberance.

2. The invention according to claim 1 in which the positioning of said center body means within said tire rim means by interference fit comprises the steps of:

positioning said center body means and said tire rim means in a concentric position relative to one another;

pressing said center body means and said tire rim means together by force into close juxtaposition.

3. The invention according to claim 2 wherein said pressing is accomplished through one or more hydraulic fixture means.

4. The invention according to claim 3 wherein said hydraulic fixture means comprises:

center body restraining fixture means on which said center body means is securely positioned, said center body restraining means cooperating with means for restraining said hub portion of said center body means;

lower tire rim support means; and upper rim platen press means capable of pressing said tire rim means about said center body means.

5. The invention according to claim 4 wherein said hydraulic fixture means further comprises:

peripheral band locating means, said locating means comprising fixture mounting pins which protrude through a plurality of wheel mounting orifices in said hub portion of said center body means;

said locating means locating said outer peripheral band between said plurality of male and female forming tool means thereby ensuring proper placement of protruberances in said outer peripheral band, even when said band is noncontinuous in design, such as on spider center bodies.

6. The invention according to claim 1 wherein both said plurality of male and female forming tool means are hydraulically actuated and located respectively.

7. The invention according to claim 1 wherein said plurality of aligned male and female forming tool means comprises three or more batteries having male and female forming tool pairs radially positioned about said wheel assembly, each said battery having two or more of said male and female forming tool pairs.

8. The invention according to claim 1 in which all said plurality of male and female forming tool means are actuated simultaneously to fabricate said protruberances, thereby enabling counterbalancing of forces exerted on said wheel assembly.

9. The invention according to claim 1 in which each of said plurality of male forming tools has a conical geometric shape.

10. The invention according to claim 9 wherein said conical geometric shape of each of said plurality of male forming tools has a conical angle in the range of 45° to 60°.

11. The invention according to claim 1 in which each of said plurality of male forming tools has a diameter in the range of ⅜-5% to ⅜-5% of the opening dimension of each of said plurality of female forming tools.

* * * * *

UNITED STATES PATENT AND TRADEMARK OFFICE
CERTIFICATE OF CORRECTION

PATENT NO. : 4,074,408
DATED : February 21, 1978
INVENTOR(S) : DALTON M. DAVIS

It is certified that error appears in the above-identified patent and that said Letters Patent are hereby corrected as shown below:

Col. 5, line 14: After "FIG. 1", "a" should be --as--;

Col. 5, line 51: "peferred" should be --preferred--;

Col. 7, line 39: "located" should be --locating--;

Col. 8, line 59: Change second occurrence of "2/3-5%" to --2/3+5%--.

Signed and Sealed this

Twenty-fifth Day of July 1978

[SEAL]

Attest:

RUTH C. MASON
Attesting Officer

DONALD W. BANNER
Commissioner of Patents and Trademarks